United States Patent [19]
Borgren

[11] Patent Number: 5,198,076
[45] Date of Patent: * Mar. 30, 1993

[54] LOW-PRESSURE DESALINIZATION DEVICE

[75] Inventor: Peter M. Borgren, Duluth, Minn.

[73] Assignee: Bowpec Incorporated, Duluth, Minn.

[*] Notice: The portion of the term of this patent subsequent to Nov. 12, 2008 has been disclaimed.

[21] Appl. No.: 737,438

[22] Filed: Jul. 29, 1991

Related U.S. Application Data

[63] Continuation-in-part of Ser. No. 509,366, Apr. 16, 1990, Pat. No. 5,064,505.

[51] Int. Cl.$^5$ .............................................. B01D 3/10
[52] U.S. Cl. ................................ 202/202; 159/901; 159/906; 159/DIG. 16; 159/DIG. 40; 202/185.1; 202/205; 203/11; 203/91; 203/DIG. 14; 203/DIG. 17
[58] Field of Search ......... 203/11, 41, 91, 1, DIG. 14, 203/DIG. 17, 4; 202/205, 185.1, 185.3, 202; 159/906, DIG. 16, 901, DIG. 40; 55/387

[56] References Cited

U.S. PATENT DOCUMENTS

| | | | |
|---|---|---|---|
| 1,700,675 | 5/1927 | Goddard | 159/903 |
| 2,027,395 | 1/1936 | McVoy | 203/11 |
| 2,616,839 | 11/1952 | Ames | 202/202 |
| 2,975,107 | 3/1961 | Friedman | 203/10 |
| 3,015,613 | 1/1962 | Edmondson | 159/903 |
| 3,206,380 | 9/1965 | Daviau | 203/11 |
| 3,577,320 | 5/1971 | Randell | 202/203 |
| 3,582,473 | 6/1971 | Barnstead | 203/11 |
| 3,775,257 | 11/1973 | Lovrich | 202/181 |
| 3,878,054 | 4/1975 | Rodgers | 203/11 |
| 4,235,678 | 11/1980 | McKeen | 203/11 |
| 4,278,502 | 7/1981 | Stevens et al. | 203/2 |
| 4,302,297 | 11/1981 | Humiston | 202/202 |
| 4,302,682 | 11/1981 | La Coste | 203/11 |
| 4,324,984 | 4/1982 | Borgren | 290/54 |
| 4,326,923 | 4/1982 | Mortenson | 159/903 |
| 4,363,564 | 12/1982 | Borgren | 60/398 |
| 4,363,703 | 12/1982 | ElDifrawi et al. | 203/10 |
| 4,608,065 | 8/1986 | Lai | 55/269 |
| 4,882,071 | 11/1989 | Bench et al. | 203/DIG. 1 |

FOREIGN PATENT DOCUMENTS 1139937  2/1985  U.S.S.R.

*Primary Examiner*—Virginia Manoharan
*Attorney, Agent, or Firm*—Palmatier, Sjoquist & Helget

[57] ABSTRACT

A low-pressure desalinization in a water chamber having an open end submerged in a water supply such as an ocean. An air exhaust pump draws air out of the water chamber to lower the surface tension of an upper stratum of water, which is thereby converted to vapor and subsequently condensed to nonsalinated water and collected in a U-shaped trap with a pair of sealing, closable valves. Moreover, a velocity enhancing parabolic channel is included for efficiently utilizing the potential energy of the fresh water. The fresh water is conveyed from its height at the top of the water chamber to a turbine via a velocity enhancement parabolic channel which enhances the velocity of the water for the turbine. The desalinator also includes a plurality of strips of sheeting partially immersed in the water being desalinated and drawing water therefrom via capillary action to increase the surface area of the water being subjected to the vacuum.

11 Claims, 6 Drawing Sheets

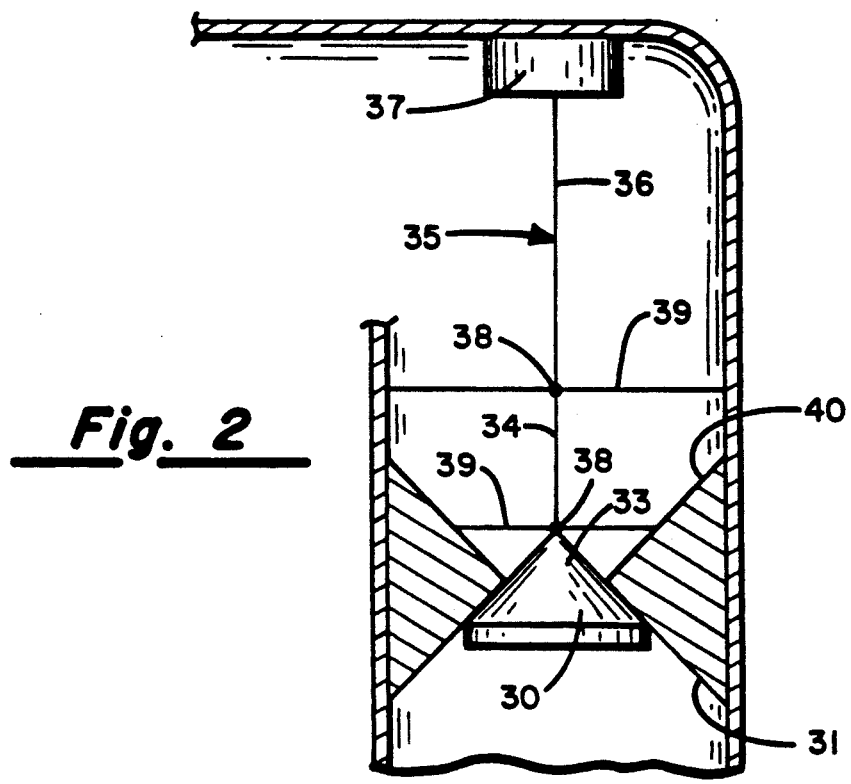
_Fig. 2_
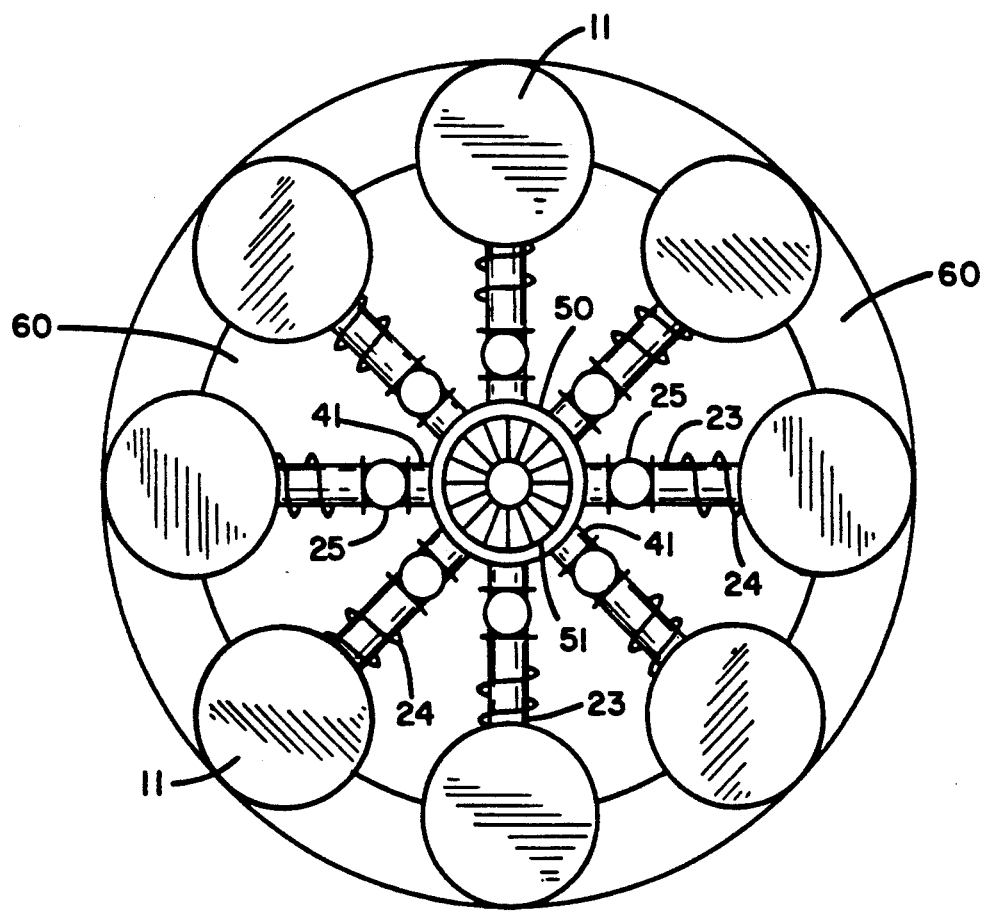
_Fig. 3_

LOW-PRESSURE DESALINIZATION DEVICE

This application is a continuation-in-part of my prior, copending Pat. application Ser. No. 509,366, filed on Apr. 16, 1990, now U.S. Pat. No. 5,064,505.

The present invention relates to desalinization devices and more particularly to low-pressure desalinization devices.

BACKGROUND OF THE INVENTION

Desalinization is the removal of salts and other chemicals from seawater or saline water to obtain pure, fresh, distilled water as the desired product. Methods of desalinization include evaporation, distillation, multi-effect evaporation, multistage flash evaporation, thin film distillation, reverse osmosis, freeze crystallization, ionic separation and electrodialysis.

In a distillation method of desalinization, it is desirable to assist the distillation by creating a partial vacuum because less energy is needed to boil water under low-pressure conditions. At standard atmospheric pressure at sea level, water boils at 100° C. At lower pressures than standard, water boils at temperatures less than 100° C. For example, water boils at less than 100° C. at high altitude where the atmospheric pressure is lower than the standard pressure at sea level. Mountain climbers use less propane at altitudes of 15,000 feet to boil a given amount of water than it takes to boil that same quantity of water at sea level.

One example of a distillation method utilizing low-pressure conditions is the Friedman U.S. Pat. No. 2,975,107 issued Mar. 14, 1961. In one embodiment, Friedman discloses a distillation chamber and a combined vacuum and condensation chamber. In operation, the distillation chamber is filled with seawater and the vacuum chamber is filled with apparently fresh water. The chambers are heated and steam produced in the vacuum chamber is exhausted to the atmosphere. Subsequently, the vacuum chamber is closed relative to the atmosphere and opened relative to the main chamber, and heating of the vacuum chamber is discontinued. As the vacuum chamber cools, a vacuum is formed in the chambers. As the distillation chamber is heated to boil water in the low-pressure conditions, steam passes from the distillation chamber to the vacuum and condensation chamber where a refrigeration apparatus condenses the steam.

One problem with a distillation apparatus such as disclosed by Friedman is that it utilizes a closed chamber. The undesirable salt by-products of the desalinization process must be removed from, and more seawater added to, the closed distillation chamber before the desalinization process can begin anew.

Another problem with a distillation apparatus such as used by Friedman is that apparently fresh water must be used to start the desalinization process. In one embodiment, Friedman creates a vacuum in a vacuum chamber by boiling water, which is apparently fresh, unsalted, nonsaline water. After water has been boiled in the vacuum chamber, Friedman closes the vacuum chamber to the outside atmosphere and allows steam to condense in the same chamber to produce distilled water.

SUMMARY OF THE INVENTION

An object of the present invention is to create low-pressure conditions to facilitate the conversion of seawater into a freshwater vapor.

Another object of the present invention is to continuously generate pure distilled water from an inexhaustible water supply such as an ocean.

Another object of the present invention is to convert seawater into a gas without a change in temperature.

Another object of the present invention is to capture the latent heat present in seawater by decreasing the surface tension of the seawater.

Another object of the present invention is to provide a collection trap which collects condensed, pure, distilled water yet allows maintenance of low-pressure conditions for the generation of freshwater vapor.

Another object of the present invention is to destroy the integrity of the surface tension of the water by an exhaust means to facilitate the production of fresh water.

Another object of the present invention is to facilitate the conversion of water to vapor by drawing the water in a wick-like action up sheeting immersed in the water.

A feature of the present invention is an upright and elongate water chamber having an open, bottom end which is submerged below sea level. Sheeting extends into the water to draw water via capillary action up the sheeting for easier conversion to vapor. An air exhaust vacuum creating pump is connected near an upper end of the water chamber for decreasing and controlling the surface tension of the water. A condensation pipe or a chiller cooler air exchanger and a U-shaped collection trap is connected to the upper portion of the chamber and includes a refrigeration unit. A velocity enhancement, hydro-collector water turbine is connected to a distal end of a parabolic channel disposed between the U-shaped collection trap and the turbine. The channel increases the velocity of the fresh water produced and is mounted on a trestle to feed the rapidly flowing water into the turbine.

In operation, the air exhaust pump pumps air out of the water chamber and may help to maintain the vacuum. As a vacuum is created, seawater rises in the water chamber by virtue of atmospheric pressure to a height of approximately 34 feet. With such a vacuum, the surface tension of the water is significantly decreased, and a freshwater vapor is created. The vapor flows upward 50–100 feet or more and into the condensation pipe where it is condensed by the chiller cooler refrigeration unit to pure, distilled water. The condensed fresh water flows into the collection trap and into the velocity-enhancing parabolic channel and subsequently into the turbine.

An advantage of the present invention is that seawater is efficiently desalinated. Less energy is needed for desalinization at low pressures, and the air exhaust unit which produces the low pressure is operated at minimal cost. One feature contributing to this advantage is the sheeting that effectively increases the surface area of the water which may be converted to vapor.

Another advantage of the present invention is that significant amounts of pollution-free energy are produced by utilizing atmospheric pressure and the latent heat of seawater as work-producing entities.

Another advantage of the present invention is that the energy produced consumes nothing, is environmentally clean, and renewable forever.

Another advantage of the land-based desalinator is that it is not exposed to wave action and, hence, is more stable and easier to service and maintain.

Another advantage of the present invention is that it utilizes as its water source an inexhaustible supply such as an ocean or large lake.

BRIEF DESCRIPTION OF THE DRAWINGS

FIG. 2 is an enlarged schematic view of an alternate valve of the desalinization apparatus;

FIG. 3 shows a number of desalinators disposed radially about one turbine.

DETAILED DESCRIPTION OF THE PREFERRED EMBODIMENT

Figure 1:
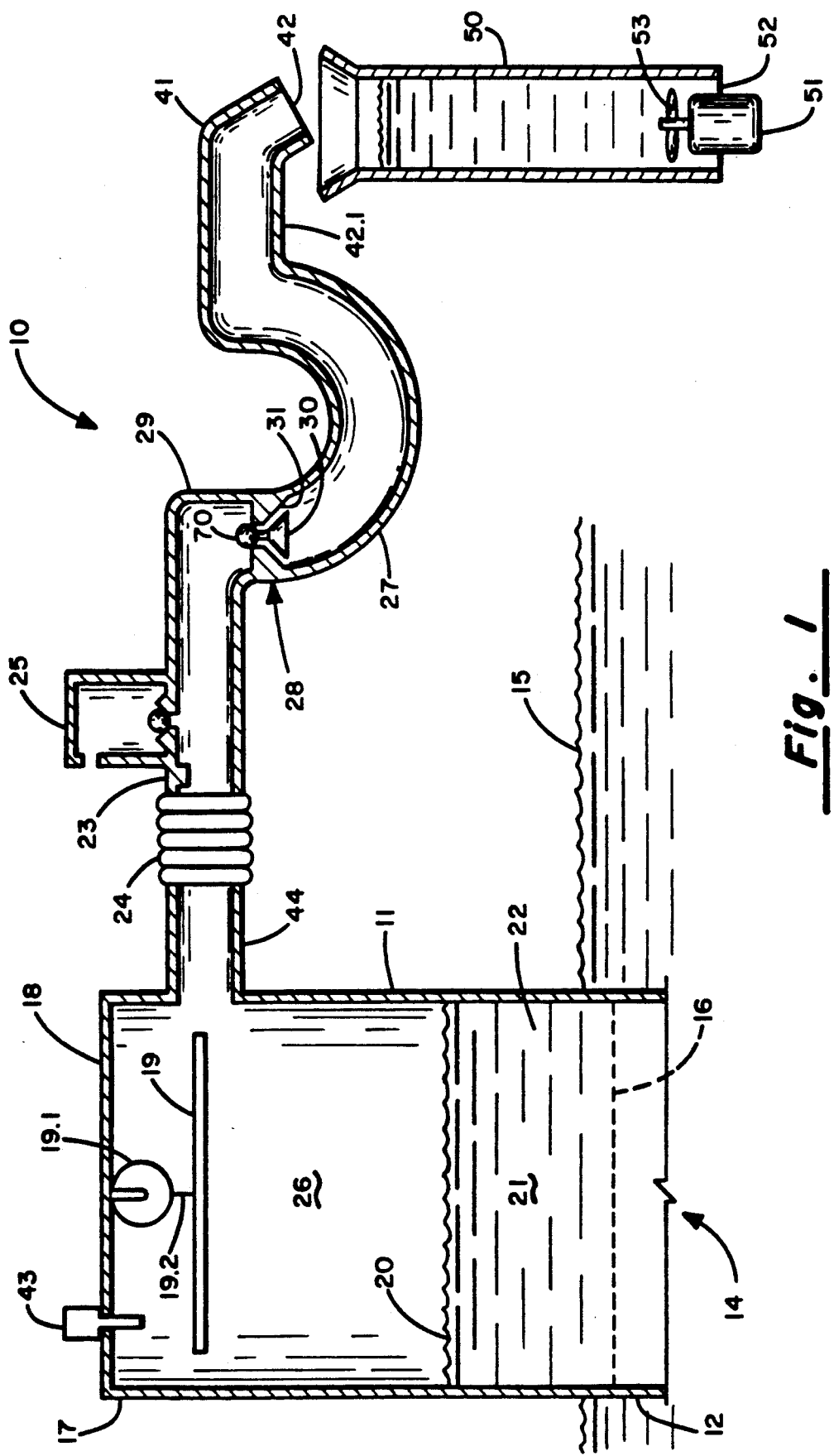
FIG. 1 is a schematic view of the low-pressure desalinization apparatus.

As shown in FIG. 1, a desalinization apparatus 10 has an elongate, upright cylinder or water chamber 11 with an open, submerged bottom end or portion 12 submerged in a sea or ocean. The end 12 forms a bottom opening 14 which is disposed below a level 15 of the sea. A disk-like debris collecting grid 16 is affixed in the bottom end 12 for the collection of undesirable foreign particles. The grid 16 may be formed of a nylon netting or other like material which is impervious to and nonreactive with seawater.

An upper end 17 of the cylinder 11 is sealed and closed by an upper sealing end plate 18. The end plate 18 is welded to the upper end 17 of the cylinder 11 so that the cylinder 11 and end plate 18 are integral and substantially one piece.

An auxiliary heating element 19 is connected to the end plate 18 by pulley means 19.1. The heating element 19 may be floatable and rise and fall with an upper internal level 20 of water 21 within an interior 26 of the cylinder 11, or be disposed slightly above the level 20 of the water 21. If a floatable heating element 19 is used, the pulley means 19.1 draws in and releases a cord 19.2 connected to the heating element 19. If the heating element 19 is nonfloatable and disposed slightly above the water level 20, the pulley means 19.1 controls the height of the heating element 19. Heating element 19 includes a rheostat for varying the temperature of the element 19.

A substantially horizontal condensation pipe 23 is connected to the upper portion 17 of the cylinder 11. A refrigerator unit 24 or chiller cooler heat exchanger is mounted in pipe 23 for condensing steam flowing in pipe 23.

An air exhaust pump 25 is affixed to a distal end of the condensation pipe 23 so that the refrigeration unit 24 is disposed between the air exhaust pump 25 and the cylinder 11. The air exhaust pump 25 exhausts air from the pipe 23 and cylinder 11. In exhausting air from the cylinder 11 and pipe 23, the air exhaust pump 25 creates a low pressure in an air space 26 in the cylinder 11 and in the condensation pipe 23. As a low pressure or vacuum is created in cylinder 11, water rises approximately 34 feet in the interior 22 of the cylinder 11 by virtue of atmospheric pressure.

As shown in FIGS. 1 and 2, a U-shaped collection trap 27 is connected to and extends downwardly from the condensation pipe 23. A float valve 28 is connected in an incipient water-collecting upper vertical end 29 of the collection trap 27. As shown in FIG. 2, in one embodiment the float valve 28 has a conical-like float 30 sealingly cooperating with a lower tapered surface 31 below an opening in the incipient collecting end 29. The density of the float 30 is less than the density of water and thus the float 30 floats on water. An upper pointed end 33 of the float 30 is affixed to a lower end 34 of a flexible element or cord 35. An upper end 36 of the flexible element 35 is affixed to a support 37 connected to the interior of the condensation pipe 23. The flexible element or cord 35 passes through and is guided by a plurality of ring-like guides 38 which are suspended in the incipient collecting end 29 by a plurality of taut cord or wire segments 39. A pair of the cord segments 39 may be affixed to an upper tapered surface 40 above the opening.

A collection tank 50 may be disposed below a dispensing end 41 of the collection trap 27. The dispensing end 41 has a closable valve 42. The closable valve 42 and a bottom edge 42.1 of the dispensing end 41 are disposed at an altitude below the altitude of the valve means 28.

A safety valve 43 is mounted on the end plate 18 for allowing air into the cylinder 11. The valve 43 may be operated if, for instance, the seawater 21 undesirably approaches a bottom edge 44 of the condensation pipe 23. When air is released into the cylinder 11 by the valve 43, the internal level 20 of the seawater 21 falls.

The collection tank 50 may include a turbine 51 disposed in a lower end 52 of the tank 50. Water flowing downwardly and out of the turbine 51 and through the lower end 52 drives a pair of turbine blades 53 to produce electricity.

As shown in FIG. 3, a set of eight cylinders 11 is disposed in a circular arrangement about one water collection tank 50. Each of the dispensing ends 41 of each of the collection traps 27 is connected to, or may be disposed above, the water collection tank 50. The valve means 28, air exhaust pump 25, refrigeration apparatus 24, and condensation pipe 23 are affixed between the water collection tank 50 and each of the cylinders 11 in accordance with the present invention. The water collection tank 50 includes a single turbine 51.

It should be noted that the cylinders 11 may be supported by or affixed to a platform 60 such as an offshore oil rig. The platform may be located in 20 feet or 20 fathoms of water or affixed to a floatable platform twenty miles or more off shore.

It should be noted that each cylinder 11 may have dimensions of approximately 50–100 feet in diameter and may be 150 feet or more in height. It should be further noted that the heating element 19, air exhaust pump 25, and refrigeration unit 24 may be electrically powered with solar or standard gasoline or diesel generator power sources. Moreover, the water chamber 11 may take other forms than the cylindrical form. For example, a horizontal cross section of the water chamber may be rectangular and have dimensions of 50 feet by 100 feet.

In operation, the bottom opening 14 of the cylinder 11 is disposed approximately ten feet below the sea level 15 of the sea or ocean 13. The air exhaust pump 25 is then operated to draw air out of the condensation pipe 23 and cylinder 11. As a vacuum is being created, water rises approximately 34 feet in the cylinder 11 by virtue of atmospheric pressure of 2160 pounds per square foot. After a maximum amount of air has been pumped out of the cylinder 11, the surface tension of the upper stratum 20 of the seawater 21 is decreased substantially. The upper stratum 20 of the seawater 21, or a portion thereof, is accordingly converted to a water vapor.

Since a mole of water vapor has a volume over 1,600 times greater than a mole of water in liquid form, the water vapor is dispersed in the cylinder 11 and condensation pipe 23 in accordance with Boyle's Law, which provides that at a fixed temperature, the pressure of a confined ideal gas varies inversely with its volume. As the vapor flows into the pipe 23, the refrigeration apparatus condenses the vapor to liquid form to produce fresh water.

As the surface tension of the seawater 21 is decreased and water vapor is dispersed into the cylinder 11, the seawater 21 releases its latent heat or thermal energy, which is effectively a solar energy source present in all bodies of water. Hence, by the reduction of pressure within the cylinder 11, water has been converted from a liquid to gas form without a change in temperature, but with a small operating temperature differential.

It should be noted that the desalinization apparatus 10 is preferably operable without the heating element 19. However, to further drive the desalinization process, the heating element 19 may be operated to increase the temperature of the water vapor and hence increase pressure in the cylinder 11 in accordance with Charles' or Gay-Lussac's law, which provides that the volume of a fixed mass of gas held at a constant pressure varies directly with the absolute temperature.

The vapor which is generated migrates or flows into the condensation pipe 23 which may be angled downwardly toward the collection trap 27. The refrigeration unit 24 condenses the vapor to pure, distilled fresh water which flows into the collecting end 29 of the trap 27 and on top of the upper surface 40 of the annulus 32 and a portion of the float 30.

As the vapor thus generated is condensed, the collecting end 29 of the trap 27 fills with fresh water. Before the level of the water in the collecting end 29 approaches the lower edge 44 of the condensation pipe 23, the float 38 is opened intermittently by the weight of the water collected in the collecting end 29, forcing the float 30 downwardly and out of a sealing engagement with the opening. Since float 30 is continuously urged upwardly, only a portion of the water collected in the collecting end 29 flows into the main portion of the collection trap 27 before the float 30 is urged back into a sealing engagement with the opening. The float 30 rises to a sealing engagement when the weight of the water remaining in collecting end 29 is insufficient to hold the float 30 down and away from the opening. Hence distilled water is conveyed periodically to the main bottom portion of the collection trap 27 while maintaining low-pressure conditions in the condensation pipe 23 and the water chamber 11.

It should be noted that the flexible element or cord 35 may be elastic to sealingly hold the float 30 upwardly against the tapered lower surface 31 of the opening even when standard atmospheric conditions exist in the condensation pipe 23 and the water chamber 11, such as when the lower end 12 is initially inserted into a water source 13 or when the apparatus 10 is not operating. It should also be noted that if a sufficient volume of water is present in the collection trap 27, the float 30 is urged against the opening.

In an alternate embodiment of the invention, the valve means 28 may include a ball 70 connected to the float 30. The ball 70 is floatable and hence rises and falls with the level of the water in the incipient collection end 29. When the ball 70 rises a sufficient distance, the valve means 28 opens and allows water to flow into the collection trap 27. As water flows through the valve means 28, the low-pressure conditions in cylinder 11 and condensation pipe 23 are maintained. As water runs through the valve means 28 and the water level in end 29 decreases, the ball 70 is lowered by the decreasing water level and hence closes the valve means 28. When the water level is increased in end 29, the ball 70 opens the valve means 28 and the process is repeated.

As water flows into and fills the water collection trap 27, water rises to the dispensing end 41. As the dispensing end 41 receives the water, the water runs onto and bears against the valve 42. Since valve 42 is disposed at a lower altitude than valve means 28, water is released from valve 42 when water enters trap 27 through valve 28.

As the dispensing end 41 releases water, the water falls into the water collection tank 50. As the water falls into the tank 50, the water drives the turbine blades 53. The desalinated, purified water may than be conveyed from tank end 52 for storage or use.

It should be noted that end 52 may be closed to collect a certain amount of water in the tank 50. Subsequently, end 52 may be open to release water to drive the turbine blades 53.

The cylinder 11 may have dimensions of 50 feet by 100 feet and may be approximately 100–150 feet high. The cylinder 11 may be formed of heavy gauge sheet iron in sections welded or seamed together. The top 17 of the cylinder 11 may be reinforced because approximately 2,160 pounds of atmospheric pressure per square foot may be exerted on the cylinder 11. It should also be noted that refrigeration unit 24 may include copper tubing filled with Freon and powered by an electrical pump to circulate the coolant. The air exhaust pump 25 may be powered electrically with less than 2,000 watts. Power may be provided by a standard gasoline generator.

It should be further noted that the cylinder 11 may be painted with acrylic paint or have a plastic or plastic-like exterior to retard decomposition of areas exposed to seawater. Grid 16, as well as being formed from nylon or a nylon netting, may be easily removed for cleaning or replacement.

It should be further noted that another physical law driving the desalinization process is that heat chases cold. Still another physical law driving the desalinization process is that heat rises. Accordingly, the latent heat released by the seawater 21 being converted to water vapor rises with the water vapor to the upper portion of the cylinder 11, where the water vapor is condensed to fresh water by the refrigeration or chiller apparatus.

Figure 4:
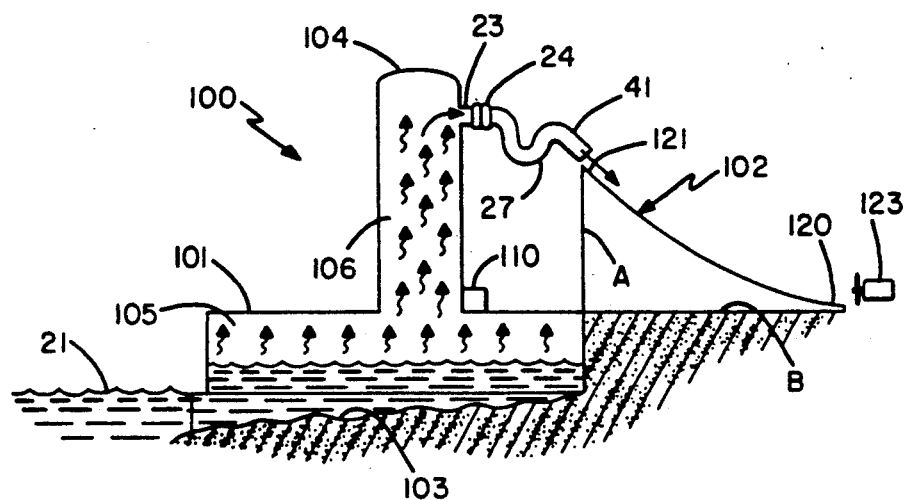
FIG. 4 shows a schematic view of a sea-based desalinator.
Figure 6:
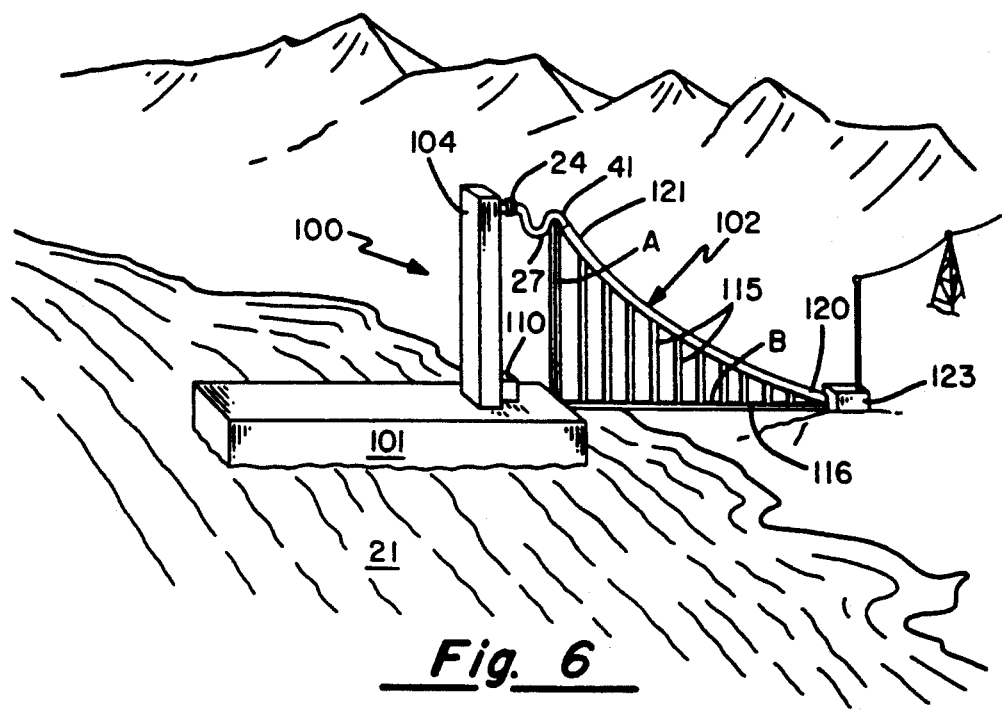
FIG. 6 shows a perspective view of the sea-based desalinator of FIG. 4.

As shown in FIGS. 4 and 6, an alternate embodiment of the invention includes a sea-based desalinator 100 with a wide rectangular base 101. The base 101 may be 200 meters wide and 400 meters in length and is typically affixed via support legs to the ocean or sea floor 103. Alternatively, the base 101 may be floatable on the water source. A water chamber 104 is mounted on the base 101 and may have dimensions of 100×35×10 meters. The respective interiors 105, 106 of the base 101 and chamber 104 communicate with each other. Water typically rises to a height of approximately 34 feet above sea level in the interior 105 when a vacuum or partial vacuum is created in the base 101 in chamber 104.

A vacuum or air exhaust pump 110 similar to pump 25 is mounted on the chamber 104 and base 101. The pump 110 creates a vacuum or partial vacuum in the interiors 105, 106. The broad dimensions of the base 101, in contrast to cylinder 11, allows a greater surface area of the water to be exposed to the vacuum. Accordingly, a greater volume of water vapor is generated.

The horizontal condensation pipe 23, refrigeration unit or chiller cooler heat exchanger or condensation means 24, and U-shape collection trap 27 are connected to an upper portion of the water chamber 104. The dispensing end 41 of the trap 27 is supported by a trestle 115. The alternative embodiment 100 also typically includes valve 30 with ball 70 and typically excludes the pump 25 as mounted in the condensation pipe 23.

The upper end of the trestle 115 which supports the dispensing end 41 also supports one end of a velocity enhancement curve or channel 120. The channel 120 is parabolic and is supported by the trestle 115 which is set in a concrete base 116 partially disposed on land. As to velocity enhancement principles or maximum water velocity of water flowing down the channel 120, the Borgren U.S. Pat. No. 4,363,564 is hereby incorporated by reference.

An intake portion 121 of the channel 120 is affixed to the outlet 41 of the trap 27. An outlet portion 122 of the channel 120 leads into a turbine 123 which also may be driven in part by velocity enhancement principles.

Figure 5:
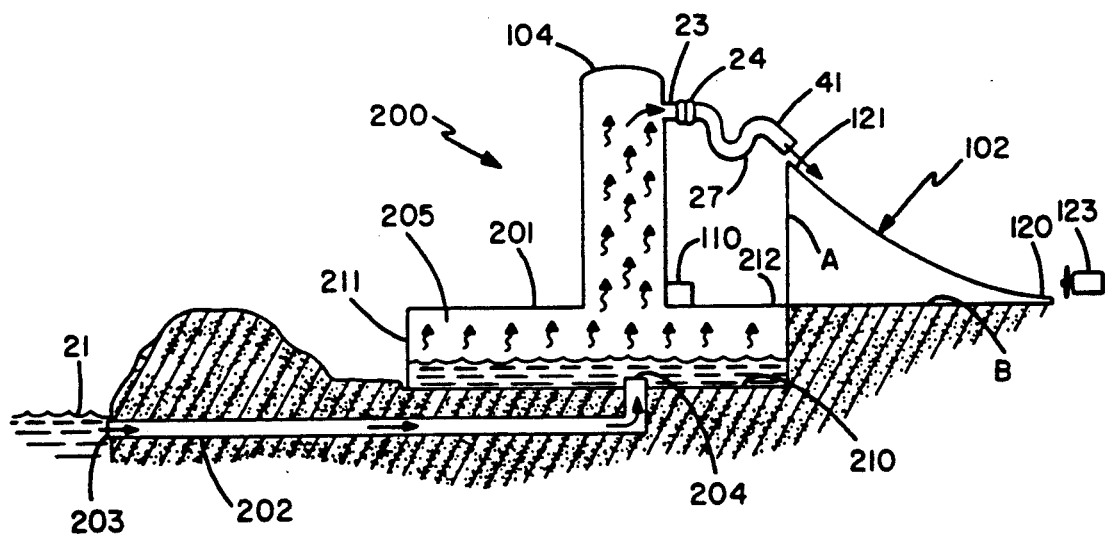
FIG. 5 shows a schematic view of a land-based desalinator.
Figure 7:
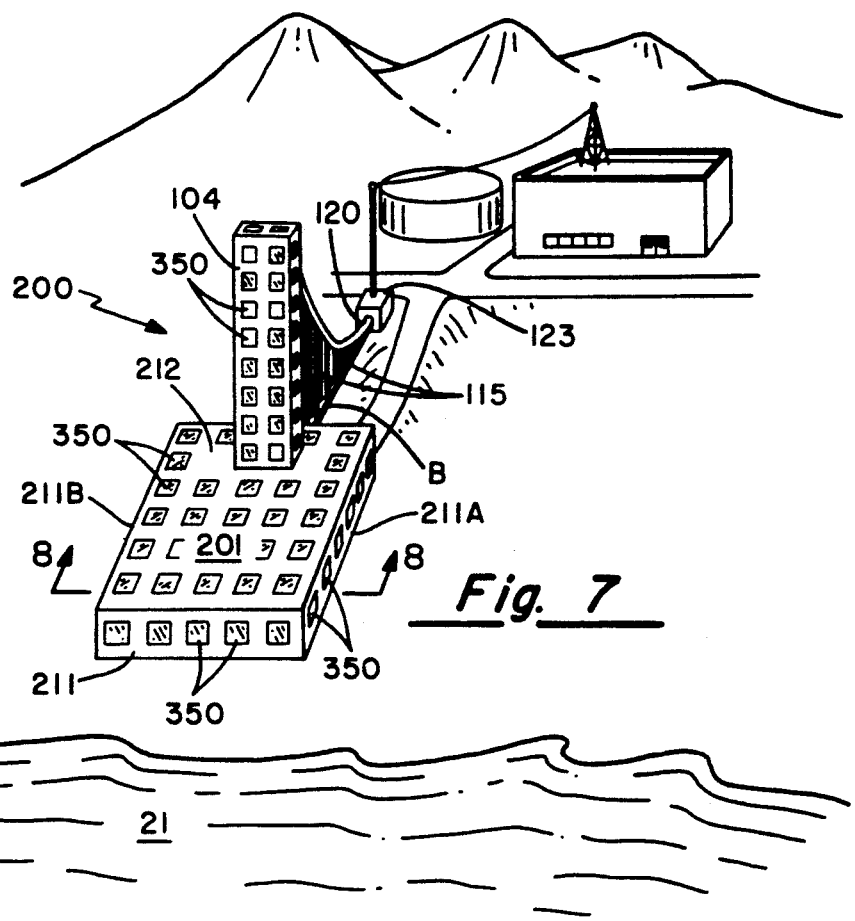
FIG. 7 shows a perspective view of a land-based desalinator.

As shown in FIGS. 5 and 7, another alternate embodiment of the invention includes a land-based desalinator 200 with a wide rectangular reservoir 201 disposed on land. A fill pipe 202 includes an intake 203 disposed in the water 21 such as an ocean or sea. An outlet 204 of the pipe 202 leads into the interior 205 of the reservoir 201.

The reservoir 201 includes a floor 210, sidewalls 211, and a top 212. The land-based desalinator 200 may include a plurality of fill tubes or pipes 202 to provide a passive circulation in the reservoir 201 so that, as water vapor is produced, brine is circulated back to the ocean.

The land-based desalinator 200 otherwise includes the features of embodiment 100, including the water chamber 104, vacuum pump 110, condensation pipe 23, chiller cooler heat exchanger or condensation means 24, trap 27, valve 30 with ball 70, trestle 115, velocity enhancement curve or channel 120, and turbine 123.

Figure 8:
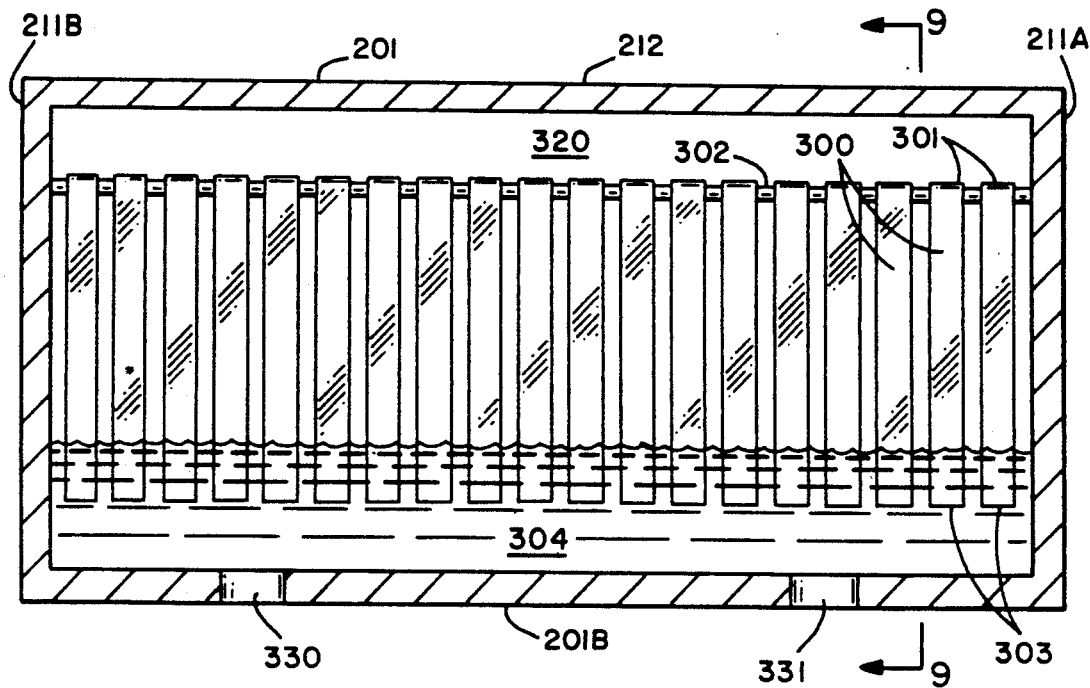
FIG. 8 is a section view at lines 8—8 of FIG. 7.

In another alternate embodiment of the invention, as shown in FIG. 8, the reservoir 201 may include strips of fabric or fabric-like sheeting 300 for facilitating the conversion of water to vapor by increasing the surface area of the water by drawing the water via a capillary or wick-like action up the strips of sheeting 300. Each of the strips of sheeting 300 includes an upper end 301 looped around a rod 302 extending between sidewalls 211 of the reservoir 201 and a lower end 303 immersed in the water 304 of the reservoir. The strips 300 are typically formed of cotton. Each of the strips of sheeting 300 may be 0.25 inches in thickness, 1-5 feet or more in width, and 5-50 feet or more in length.

Figures 9, 10, 11:
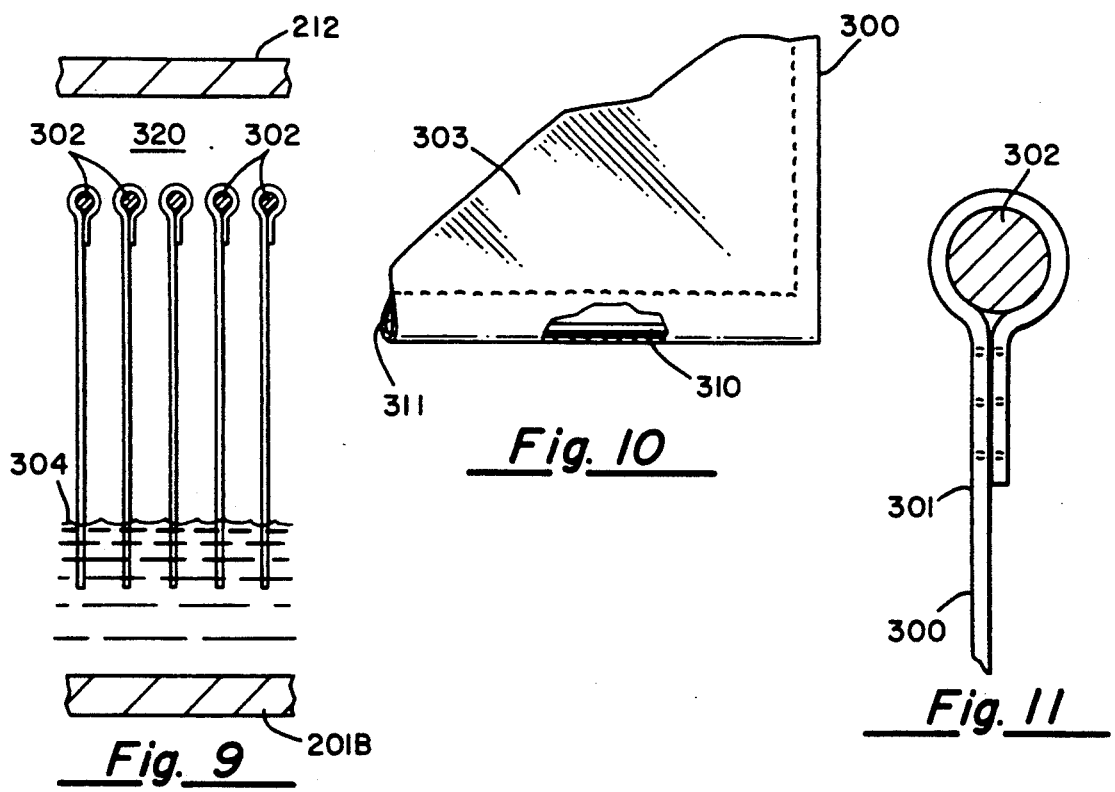
FIG. 9 is a section view at lines 9—9 of FIG. 8.
FIG. 10 is a detail view of a bottom portion of one of the strips of sheeting of FIG. 8.
FIG. 11 is a detail view showing a top portion of the sheeting of FIG. 9.

As shown in FIGS. 8 and 9, the strips of sheeting 300 may be arranged in spaced-apart relation from one sidewall 211A to an opposing sidewall 211B such that the strips of sheeting 300 are arranged in either regularly or irregularly spaced rows and columns. Although the sheeting 300 may be formed in one continuous sheet, one advantage of forming strips is that strips are replaceable more easily. The strips of sheeting 300 may need replacing as salt water may degrade the sheeting 300. To minimize such degradation, the strips of sheeting 300 may be formed of polyester or other polymer fabric less resistant to corrosion in seawater.

As shown in FIG. 10, the bottom end 303 of each of the strips of sheeting 300 is weighted by a relatively noncorrosive rod 310 formed of, for example, plastic. The elongate rod 310 is disposed in a pocket 311 stitched in the bottom end 303. The weight of the rod 310 aids the bottom end 303 in remaining immersed in the water 304.

As shown in FIGS. 9 and 11, each of the upper ends 301 are looped around the rod 302 such that each of the strips of sheeting 300 are slidable on the rod 302. As further shown in FIG. 9, the reservoir 201 includes a plurality of rods 302 affixed adjacent to but spaced from the ceiling 212 of the reservoir 201 to allow an elongate space 320 for the flow of water vapor in the water chamber 104. In the land-based reservoir 201, the rods 302 may be fixed relatively close together such as a foot apart to maximize the surface area of the water disposed in the sea-based reservoir 101, but in the reservoir 101 the rods 302 may be fixed relatively further apart such as a yard apart in view of the currents present in the larger body of water.

As shown in FIG. 8, it should be noted that the floor 201B of the reservoir 201 includes an inlet 330 and outlet 331 to provide a continuous flow of water through the reservoir 201. Such a continuous flow minimizes the build up of salt in the reservoir 201. It should further be noted that reservoirs 101 and 201 may be referred to as merely an extension of the water chamber 104 to increase the surface area of the water source being subjected to the vacuum.

In the operation of the strips of sheeting 300, the end 303 of each of the strips of sheeting 300 is immersed approximately three feet deep after the water 304 has been drawn upwardly in the reservoir via the low-pressure condition created. Water is continually drawn like a wick via capillary action upwardly on each of the strips of sheeting 300. Accordingly, a greater surface area of water is available for conversion to vapor via the vacuum or low-pressure condition. It is further believed that the water which wets and is drawn up each of the strips of sheeting 300 has a lesser surface tension and is thus more readily converted to vapor. After the conversion from water to vapor, whether such conversion occurs on the surface of the water or from the strips of sheeting 300, the vapor rises to passage 320 and subsequently through passage 320 to the water chamber 104.

As shown in FIG. 7, it should further be noted that reservoir 201 may include a plurality of solar panels 350 on its surfaces such as on three of its sidewalls 211 and its ceiling 212. The solar panels 350 are typically also disposed on three of the sidewalls of the water chamber 104 as well as the top of the chamber 104. The solar panels 350 generate electricity for operation of the vacuum pump 110 and condensation means 24. Of course, the solar panels 350 may also be disposed on the sea-based desalinator 101.

Figure 12:
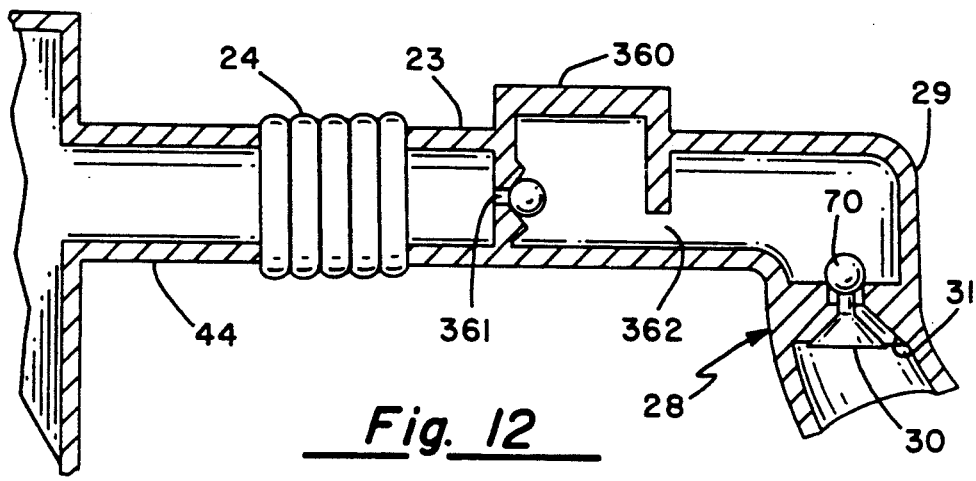
FIG. 12 is a schematic view of an alternative embodiment of the desalinator apparatus.

As shown in FIG. 12, an alternate air exhaust pump 360 includes both an inlet 361 and an outlet 362 communicating with the inside of the condensation pipe 23 to provide for a greater flow of vapor to the collection trap 27.

Figure 13:
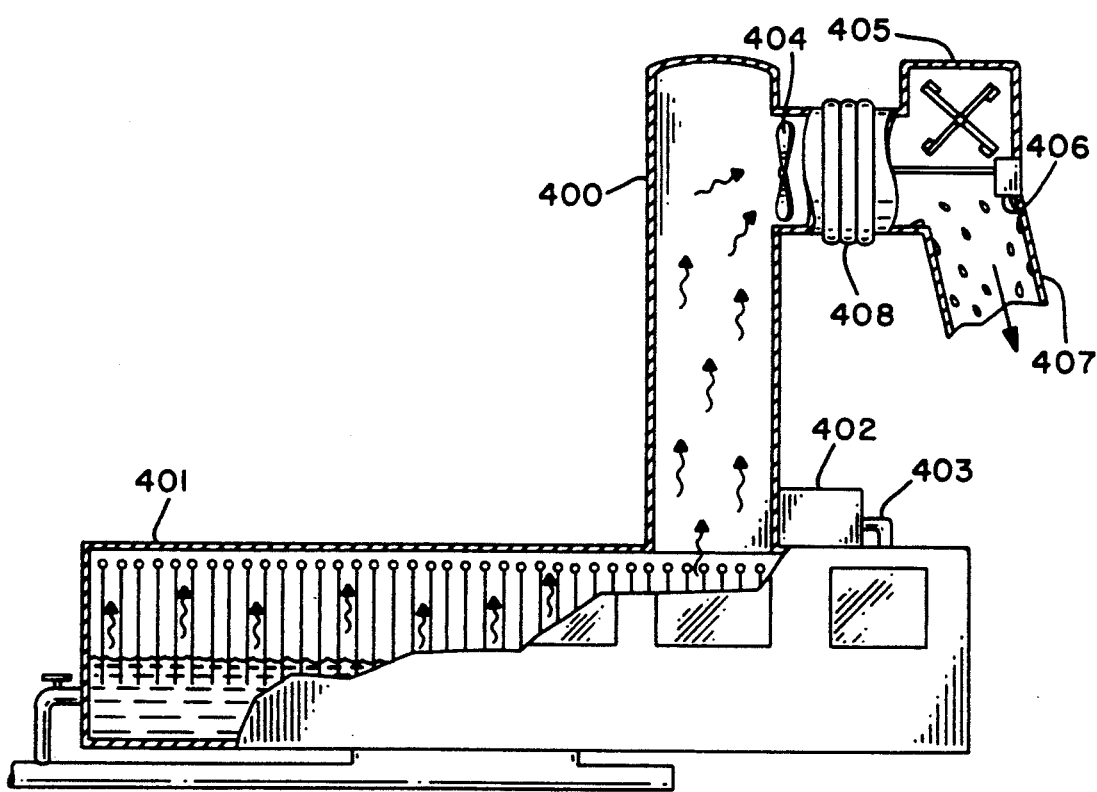
FIG. 13 is a schematic illustration of an alternate embodiment of the invention.

As shown in FIG. 13, in an alternate embodiment of the invention, a water chamber 400 and its respective base 401 includes a main vacuum pump 402 disposed at a lower portion of the chamber 400 and adjacent to the base 401. The pump 402 includes a condensate overflow conduit 403 communicating with the interior of the base 401. The chamber 400 further includes an expeller fan 404 to add impetus to the water vapor toward a second vacuum pump 405 to force the vapor to condense more rapidly and enhance the intensity of the vacuum. The second vacuum pump 405 may be a water-lubricated pump and include a drain or outlet 406 communicating with a collection trap 407. A condensation means 408, such as previously described, is disposed between the fan 404 and the second pump 405.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A distillation apparatus comprising:
   (a) a water chamber with a closed upper portion and a lower portion for engaging a water source;
   (b) a condensation and collection pipe section affixed to and extending from the upper portion of the water chamber for receiving water vapor and and collecting condensed water;
   (c) means for exhausting air from the water chamber to create a low-pressure condition therein at less than atmospheric pressure to decrease surface tension of water in the water source and to thereby facilitate the generation of vapor in the water chamber;
   (d) means connected in the condensation and collection pipe section for condensing the vapor;
   (e) collection means comprising a collection trap connected in the pipe for collecting water condensed by the condensing means, the collection means including a level control means;
   (f) distilled water conveying means for conveying the water from the collection means to a turbine, the distilled water conveying means having an upper end and a lower end, the upper end being connected to the collection means and disposed at approximately the height of the closed upper portion of the water chamber, the lower end of the distilled water conveying means disposed adjacent the turbine, the distilled water conveying means being curved between its upper and lower ends;
   (g) the turbine being driven by water flowing from the lower end of the distilled water conveying means; and
   (h) flexible water absorbent means partially immersed in the water source in the water chamber for drawing water upwardly from the water source to increase the surface area of the water source being subjected to the low-pressure condition whereby water vapor is generated directly from water in the water source and from water drawn up the flexible absorbent means and whereby the water vapor thus generated is subsequently condensed and thereby distilled.

2. The distillation apparatus of claim 1, wherein the flexible water absorbent means comprises sheeting.

3. The distillation apparatus of claim 2, wherein the sheeting comprises a plurality of elongate strips of sheeting vertically disposed.

4. The distillation apparatus of claim 3, wherein each of the strips of sheeting include top and bottom ends, the top end being fixed relative to the chamber, the bottom end being weighted and hanging freely in the water.

5. The distillation apparatus of claim 1, wherein the water chamber is land based and includes a reservoir.

6. A distillation apparatus comprising:
   (a) a water chamber with a closed upper portion and a lower portion for engaging a water source;
   (b) a condensation and collection pipe affixed to and extending from the upper portion of the water chamber;
   (c) means for exhausting air from the water chamber to create a low-pressure condition therein at less than atmospheric pressure to decrease surface tension of water in the water chamber and to thereby facilitate the generation of vapor in the water chamber;
   (d) means connected in the condensation and collection pipe for condensing vapor generated from the water chamber;
   (e) collection means comprising a collection trap connected in the condensation and collection pipe for collecting water condensed by the condensation means, the collection means including a level control means;
   (f) distilled water conveying means for conveying the water from the collection means to a turbine, the distilled water conveying means having an upper end and a lower end, the upper end being connected to the collection means and disposed at approximately the height of the closed upper portion of the water chamber, the lower end of the distilled water conveying means disposed adjacent the turbine, the distilled water conveying means being curved between its upper and lower ends;
   (g) the turbine being driven by water flowing from the lower end of the distilled water conveying means; and
   (h) the means for exhausting air comprising a pump with an inlet and outlet, the inlet opening in the direction of the water chamber, the outlet opening in the direction of the collection trap.

7. The distillation apparatus of claim 6, and the water chamber comprising an inlet and outlet for permitting circulation of water in the water source to minimize the build up of salt.

8. The distillation apparatus of claim 6, and further comprising a plurality of water chambers radially disposed relative to the turbine.

9. The distillation apparatus of claim 6, wherein the water chamber is based on land.

10. The distillation apparatus of claim 6, wherein the water chamber is based at sea.

11. The distillation apparatus of claim 6, and further comprising flexible water absorbent means partially immersed in the water source in the water chamber for drawing water upwardly from the water source to increase the surface area of the water source being subjected to the low-pressure condition.

* * * * *